(12) United States Patent
Lightfoot et al.

(10) Patent No.: US 7,058,648 B1
(45) Date of Patent: Jun. 6, 2006

(54) HIERARCHY-BASED SECURED DOCUMENT REPOSITORY

(75) Inventors: John Lightfoot, Culver City, CA (US); Jarrod Anderson, Fullerton, CA (US); James Christopher Livingston, Redondo Beach, CA (US); Greg Jones, Ladera Heights, CA (US)

(73) Assignee: Oracle International Corporation, Redwood Shores, CA (US)

( * ) Notice: Subject to any disclaimer, the term of this patent is extended or adjusted under 35 U.S.C. 154(b) by 859 days.

(21) Appl. No.: 09/728,909

(22) Filed: Dec. 1, 2000

(51) Int. Cl.
*G06F 17/30* (2006.01)

(52) U.S. Cl. .............................. 707/102; 707/3; 707/10; 709/218; 715/514

(58) Field of Classification Search .................... 707/9, 707/3, 6, 10, 102, 200, 203, 206; 709/218, 709/219; 715/514, 736, 907
See application file for complete search history.

(56) References Cited

U.S. PATENT DOCUMENTS

| | | |
|---|---|---|
| 5,047,918 A | 9/1991 | Schwartz et al. |
| 5,202,982 A | 4/1993 | Gramlich et al. |
| 5,257,366 A | 10/1993 | Adair et al. |
| 5,295,256 A | 3/1994 | Bapat |
| 5,307,490 A | 4/1994 | Davidson et al. |
| 5,388,257 A | 2/1995 | Bauer |
| 5,499,371 A | 3/1996 | Henninger et al. |
| 5,504,892 A | 4/1996 | Atsatt et al. |
| 5,544,360 A | 8/1996 | Lewak et al. |
| 5,561,763 A | 10/1996 | Eto et al. |
| 5,566,331 A | 10/1996 | Irwin, Jr. et al. |
| 5,574,915 A | 11/1996 | Lemon et al. |
| 5,625,815 A | 4/1997 | Maier et al. |
| 5,682,524 A | 10/1997 | Freund et al. |
| 5,684,990 A * | 11/1997 | Boothby ..................... 707/203 |
| 5,689,706 A | 11/1997 | Rao et al. |
| 5,737,736 A | 4/1998 | Chang |
| 5,758,153 A | 5/1998 | Atsatt et al. |

(Continued)

FOREIGN PATENT DOCUMENTS

EP        0 856 803 A2        8/1998

(Continued)

OTHER PUBLICATIONS

Ricardo, Catherine, "Database Systems: Principles, Design & Implementation," 1990, MacMillan Publishing Co., pp. 357-361, 379-380.*

(Continued)

*Primary Examiner*—Shahid Alam
(74) *Attorney, Agent, or Firm*—Hickman Palermo Truong & Becker, LLP

(57) ABSTRACT

Techniques are provided for implementing and using a hierarchy-based secured document repository. The invention, the repository allows each user access to documents based on the position(s) held by the user in the hierarchy of a company. In one embodiment, the repository includes data that reflects the hierarchy of a company ("hierarchy data"), where the hierarchy includes nodes and relationships between nodes. The repository also includes user-to-node mapping data that maps users to one or more nodes, and document-to-node mapping data that maps documents to nodes. An access mechanism is provided that determines which document a user is able to access based on the hierarchy data, the user-to-node mapping data, and the document-to-node mapping data. In one embodiment, a user is allowed to access only those documents that are (1) mapped to the same node as the user, or (2) mapped to nodes that are below (relative to the hierarchy) any of the nodes to which the user is mapped.

24 Claims, 6 Drawing Sheets

U.S. PATENT DOCUMENTS

| | | | |
|---|---|---|---|
| 5,802,518 A * | 9/1998 | Karaev et al. | 707/9 |
| 5,819,275 A * | 10/1998 | Badger et al. | 707/100 |
| 5,822,511 A | 10/1998 | Kashyap et al. | |
| 5,825,353 A | 10/1998 | Will | |
| 5,832,526 A | 11/1998 | Schuyler | |
| 5,848,246 A | 12/1998 | Gish | |
| 5,878,415 A * | 3/1999 | Olds | 707/9 |
| 5,878,434 A | 3/1999 | Draper et al. | |
| 5,892,535 A | 4/1999 | Allen et al. | |
| 5,915,253 A | 6/1999 | Christiansen | |
| 5,918,225 A | 6/1999 | White et al. | |
| 5,937,406 A | 8/1999 | Balabine et al. | |
| 5,960,194 A | 9/1999 | Choy et al. | |
| 5,978,791 A | 11/1999 | Farber et al. | |
| 5,983,215 A | 11/1999 | Ross et al. | |
| 5,991,771 A | 11/1999 | Falls et al. | |
| 6,023,706 A | 2/2000 | Schmuck et al. | |
| 6,029,160 A | 2/2000 | Cabrera et al. | |
| 6,029,166 A | 2/2000 | Mutalik et al. | |
| 6,029,175 A | 2/2000 | Chow et al. | |
| 6,052,122 A | 4/2000 | Sutcliffe et al. | |
| 6,088,694 A | 7/2000 | Burns et al. | |
| 6,092,086 A | 7/2000 | Martin et al. | |
| 6,115,741 A | 9/2000 | Domenikos et al. | |
| 6,119,118 A | 9/2000 | Kain, III et al. | |
| 6,185,574 B1 | 2/2001 | Howard et al. | |
| 6,212,512 B1 | 4/2001 | Barney et al. | |
| 6,212,557 B1 | 4/2001 | Oran | |
| 6,230,310 B1 | 5/2001 | Arrouye et al. | |
| 6,233,729 B1 | 5/2001 | Campara et al. | |
| 6,236,991 B1 * | 5/2001 | Frauenhofer et al. | 707/6 |
| 6,247,024 B1 | 6/2001 | Kincaid | |
| 6,301,605 B1 | 10/2001 | Napolitano et al. | |
| 6,314,408 B1 | 11/2001 | Salas et al. | |
| 6,321,219 B1 | 11/2001 | Gainer et al. | |
| 6,339,382 B1 | 1/2002 | Arbinger et al. | |
| 6,341,289 B1 | 1/2002 | Burroughs et al. | |
| 6,349,295 B1 | 2/2002 | Tedesco et al. | |
| 6,366,921 B1 | 4/2002 | Hansen et al. | |
| 6,366,988 B1 | 4/2002 | Skiba et al. | |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,397,231 B1 | 5/2002 | Salisbury et al. | |
| 6,421,692 B1 | 7/2002 | Milne et al. | |
| 6,430,575 B1 * | 8/2002 | Dourish et al. | 707/200 |
| 6,438,550 B1 | 8/2002 | Doyle et al. | |
| 6,438,562 B1 | 8/2002 | Gupta et al. | |
| 6,442,548 B1 | 8/2002 | Balabine et al. | |
| 6,446,091 B1 | 9/2002 | Noren et al. | |
| 6,449,652 B1 | 9/2002 | Blumenau et al. | |
| 6,594,675 B1 | 7/2003 | Schneider | |
| 6,711,595 B1 * | 3/2004 | Anantharao | 707/206 |
| 6,725,227 B1 * | 4/2004 | Li | 707/102 |
| 6,732,222 B1 | 5/2004 | Garritsen et al. | |
| 6,778,977 B1 | 8/2004 | Avadhanam et al. | |
| 6,795,821 B1 | 9/2004 | Yu | |
| 6,889,223 B1 * | 5/2005 | Hattori et al. | 707/3 |
| 2002/0194157 A1 | 12/2002 | Zait et al. | |

FOREIGN PATENT DOCUMENTS

| | | |
|---|---|---|
| WO | WO 97/46956 A1 | 12/1997 |
| WO | WO 00/14632 A1 | 3/2000 |

OTHER PUBLICATIONS

International Preliminary Examination Authority, "Written Opinion," PCT/US 03/35494, dated Jun. 14, 2005, 5 pages.

Current Claims, PCT/US 03/35494, 5 pages.

Herman Chung-Hwa Rao, et al., "An Overview of the Internet File System," 1997, IEEE, XP-002204711, pp. 474-477.

Oracle Corporation, "Oracle® iFS (Internet File System, " Technical Data Sheet, Mar. 1999, XP-002204710, pp. 1-3.

* cited by examiner

HIERARCHY-BASED SECURED DOCUMENT REPOSITORY

FIELD OF THE INVENTION

The present invention relates to document repositories and, more specifically, to a hierarchy-based secured document repository.

BACKGROUND OF THE INVENTION

A large percentage of hard-copy documents being produced today are generated from corresponding electronic documents. As with their hard-copy counterparts, electronic documents may include confidential, proprietary and/or secret information. Consequently, it is as important to be able to limit access to the electronic documents of a company, as it is to limit access to the hard-copy documents of the company.

The specific members of the company that should have access to a document will vary based on the content of the document and the policy of the company. Frequently, the position that one holds in a company dictates the documents to that the individual is allowed to access. For example, a company executive may have access to information that an office clerk is not allowed to access. An individual's relative level within the company may not be the only factor that dictates the documents to which the individual has access. For example, a relatively lower-level clerk in the financial department of a company may have rights to access financial information to which a relatively higher-level employee in the research department has no access rights.

Various approaches have been used to restrict access to electronic documents. One common approach is to use password protected shared directories. Using this approach, all documents that are to be shared among a particular group are placed in a shared directory, and the directory is password protected. The password to access the directory is then communicated to the members of the group. When a user tries to access the directory, the file system or operating system software that manages the directory requests the password from the user. If the user enters the correct password, then the user is allowed to access the folder and the entire contents thereof. Without the correct password, the user is not allowed to access the documents in the protected folder.

The password-protected shared folder approach works well in situations where there are a few, well-defined groups. However, in larger organizations it may not be practical. For example, higher-level executives may need access to the documents shared among numerous disparate groups. It is not practical to require each of the executives to remember all of the relevant passwords. It becomes even less practical when, for security reasons, the passwords are changed periodically, or in response to the departure of any member of the group.

Based on the foregoing, it is clearly desirable to be able to share electronic documents among those allowed to access them, while at the same time providing a convenient and secure system that protects the documents from those who are not authorized to access them.

SUMMARY OF THE INVENTION

Techniques are provided for implementing and using a hierarchy-based secured document repository. According to one aspect of the invention, the repository allows each user access to documents based on the position(s) held by the user in the hierarchy of a company. In one embodiment, the repository includes:

(1) data that reflects the hierarchy of a company ("hierarchy data"), where the hierarchy includes nodes and relationships between nodes;

(2) user-to-node mapping data that maps users to one or more nodes; and (3) document-to-node mapping data that maps documents to nodes.

An access mechanism is provided that determines which document a user is able to access based on the hierarchy data, the user-to-node mapping data, and the document-to-node mapping data. In one embodiment, a user is allowed to access only those documents that are (1) mapped to the same node as the user, or (2) mapped to nodes that are below (relative to the hierarchy) any of the nodes to which the user is mapped.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for implementing and using a hierarchy-based secured document repository. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
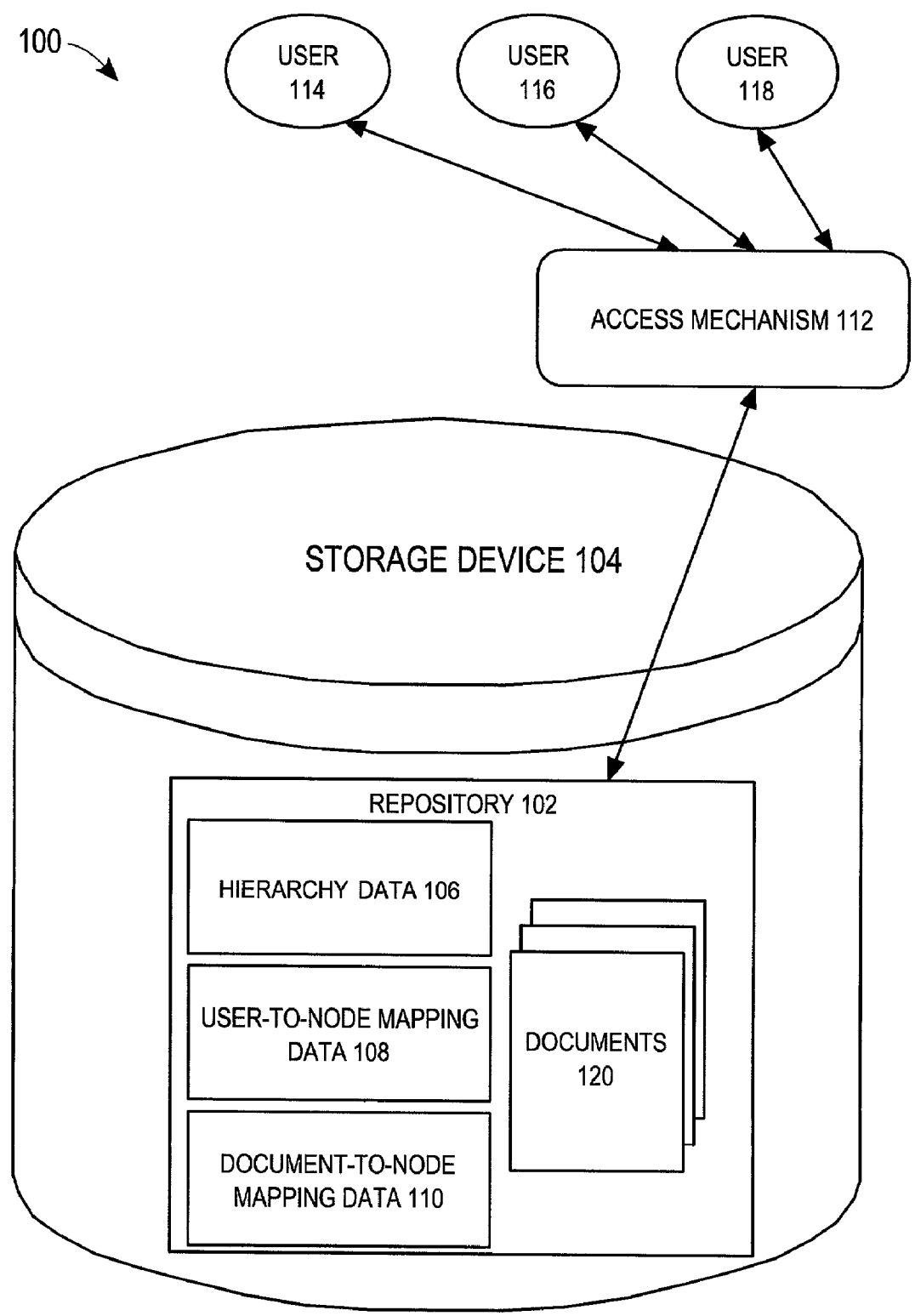
FIG. 1 is a block diagram of a repository configured according to an embodiment of the invention.

Referring to FIG. 1, it is a block diagram of a system 100 that includes a hierarchy-based secured document repository 102, according to one embodiment of the invention. In the illustrated embodiment, the repository 102 resides on a storage device 104. Storage device 104 generally represents any type or number of devices on which electronic information may be stored, including, for example, a set of magnetic disks.

Repository 102 stores a set of documents 120. As used herein, the term "document" refers to any form of electronic data item. The nature of documents 120 may vary from implementation to implementation. For example, in one implementation, documents 120 may be electronic files created by word processing programs, graphics programs, and spreadsheet programs. In an alternative embodiment, documents 120 may be computer programs or sound files. The present invention is not limited to any particular type of document.

In the illustrated embodiment, repository 102 includes data that reflects the hierarchy of a company (hierarchy data 106), where the hierarchy includes nodes and relationships between nodes. Repository 102 also includes user-to-node mapping data 108 that maps users to one or more nodes, and document-to-node mapping data 110 that maps documents to nodes.

System 110 also includes an access mechanism 112 through which users (114–118) access documents 120 stored in the repository 102. Access mechanism 112 determines which of documents 120 a user is able to access based on the hierarchy data 106, the user-to-node mapping data 108, and the document-to-node mapping data 110. In one embodiment, a user is allowed to access only those documents that are mapped to the same nodes as the user, or mapped to nodes that are below (relative to the hierarchy) the nodes to which the user is mapped.

Exemplary Mappings

Figure 2:
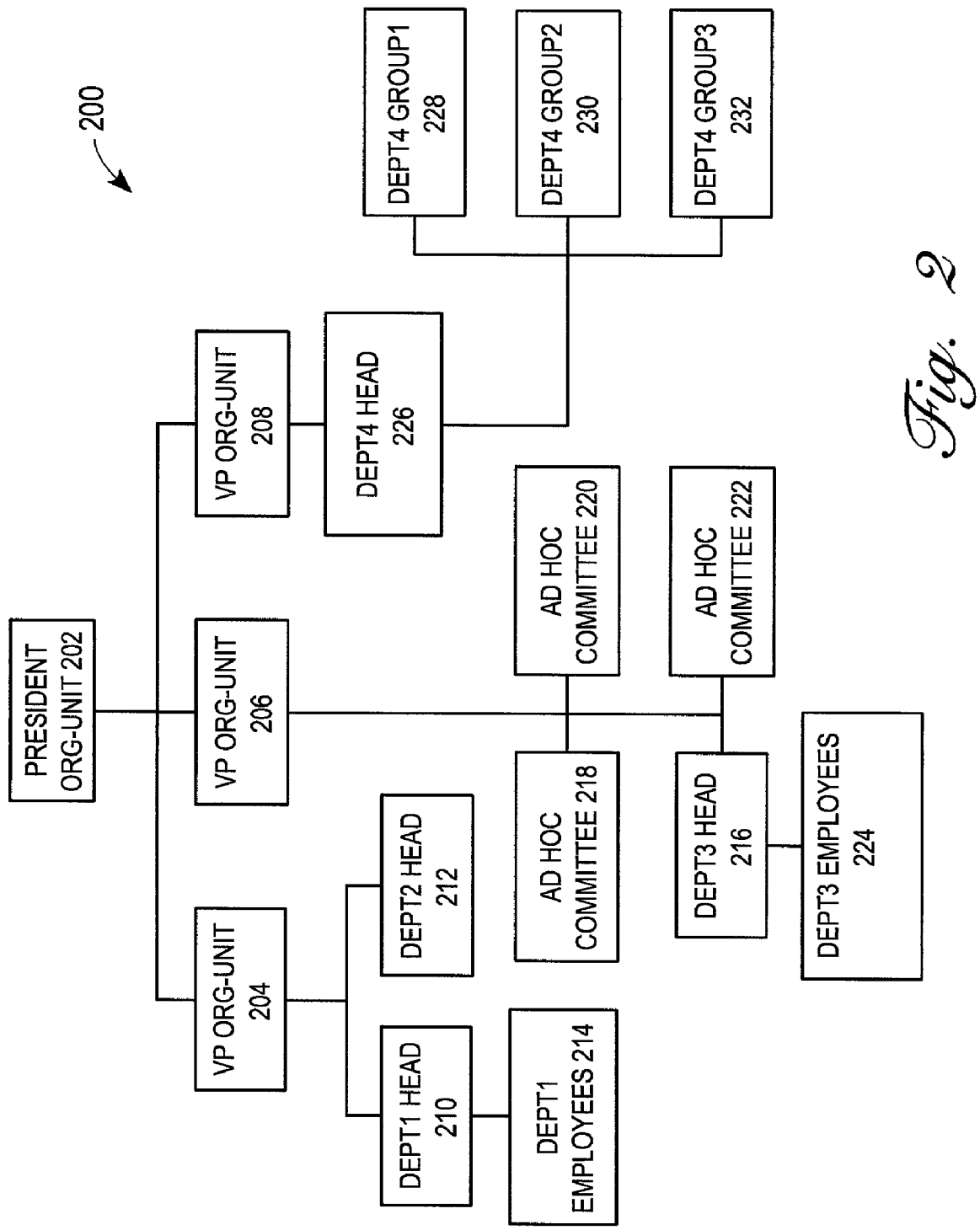
FIG. 2 is a block diagram illustrating an exemplary hierarchy of a company.

Assume that a company ("company X") is organized according to the hierarchy 200 illustrated in FIG. 2. Each node in the hierarchy corresponds to what is referred to herein as an "ORG-UNIT". In general, an ORG-UNIT is a position, role, or group that has or may have distinct access privileges to the documents in repository 102 relative to the access privileges of other positions, roles and groups within an organization.

Referring to FIG. 2, a president ORG-UNIT 202 is at the top level of the hierarchy. Various vice-president ORG-UNITs 204, 206 and 208 are at the level immediately under the president ORG-UNIT 202. VP ORG-UNIT 204 is responsible for two departments, DEPT1 and DEPT2. Thus, the ORG-UNITs DEPT1 HEAD 210 and DEPT2 HEAD 212 are under VP ORG-UNIT 204. The ORG-UNIT of DEPT1 EMPLOYEES 214 is below the ORG-UNIT of DEPT1 HEAD 210.

VP ORG-UNIT 206 is in charge of one department (DEPT 3) and three ad hoc committees (AD HOC COMMITTEES 218, 220 and 222). The DEPT3 HEAD ORG-UNIT 216 is below VP ORG-UNIT 206, and the DEPT3 EMPLOYEES ORG-UNIT 224 is below DEPT3 HEAD 216.

VP ORG-UNIT 208 is responsible for one department (DEPT4) that has three distinct groups. The DEPT4 HEAD ORG-UNIT 226 is below VP ORG-UNIT 208, and all of three groups of the department (DEPT4 GROUP 1228, DEPT4 GROUP2 230, DEPT4 GROUP3 232) are below the DEPT4 HEAD ORG-UNIT 226.

The company hierarchy 200 shown in FIG. 2, which is much simpler than the organizational hierarchy of most companies and organizations, is presented solely for the purpose of explanation. The invention is not limited to any particular type or structure of hierarchy. Further, an embodiment is described in which the hierarchy represents the relationship between ORG-UNITs within a company X. However, the present techniques may be used to secure the documents of any entity that has document access policies that correspond to a hierarchical structure. The term "organization" is used herein to refer to all such entities.

Figure 3:
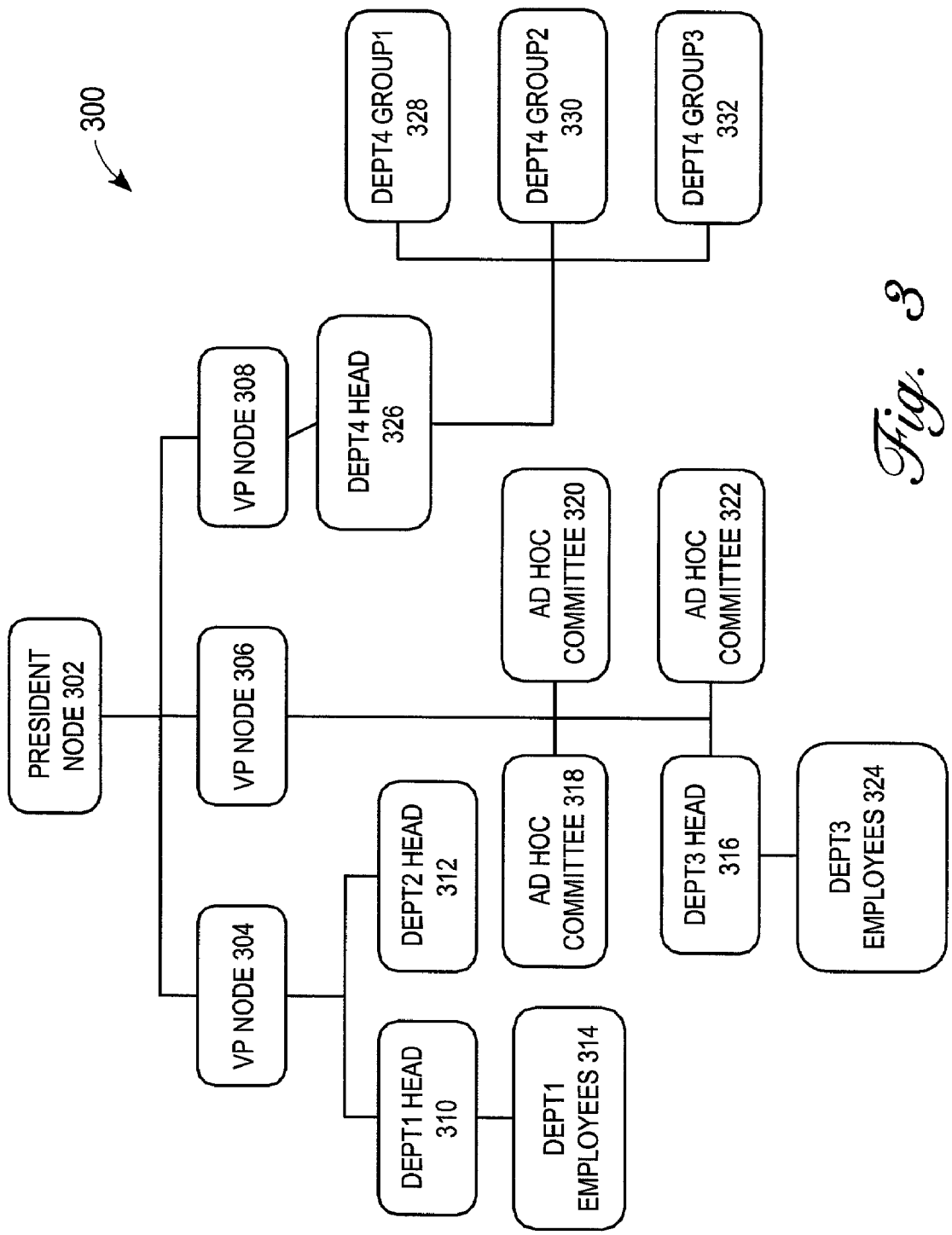
FIG. 3 is a block diagram of a node hierarchy that reflects the company hierarchy shown in FIG. 2.

Referring to FIG. 3, it illustrates a node hierarchy 300 represented in the hierarchy data 106 within the repository 102 used by company X. In particular, each ORG-UNIT in the organization hierarchy 200 of company X has a corresponding node in the node hierarchy 300. Hierarchy data 106 includes data that identifies the nodes, and data that identifies the relationship between the nodes.

The nature of hierarchy data 106 may vary from implementation to implementation. For example, in one embodiment, repository 102 is implemented in a relational database. In such an embodiment, a "hierarchy table" may be used to store the hierarchy data 106, where each row of the hierarchy table corresponds to a node, and includes a field that identifies the parent node of that node. Instead of or in addition to storing parent node information, the row associated with a node may store child node information. Alternatively, a first table may be used to store rows that correspond to nodes, while a second table is used to store data indicating the parent-child relationships between the nodes. The present invention is not limited to any particular structure for storing the hierarchical data 102.

Figure 4:
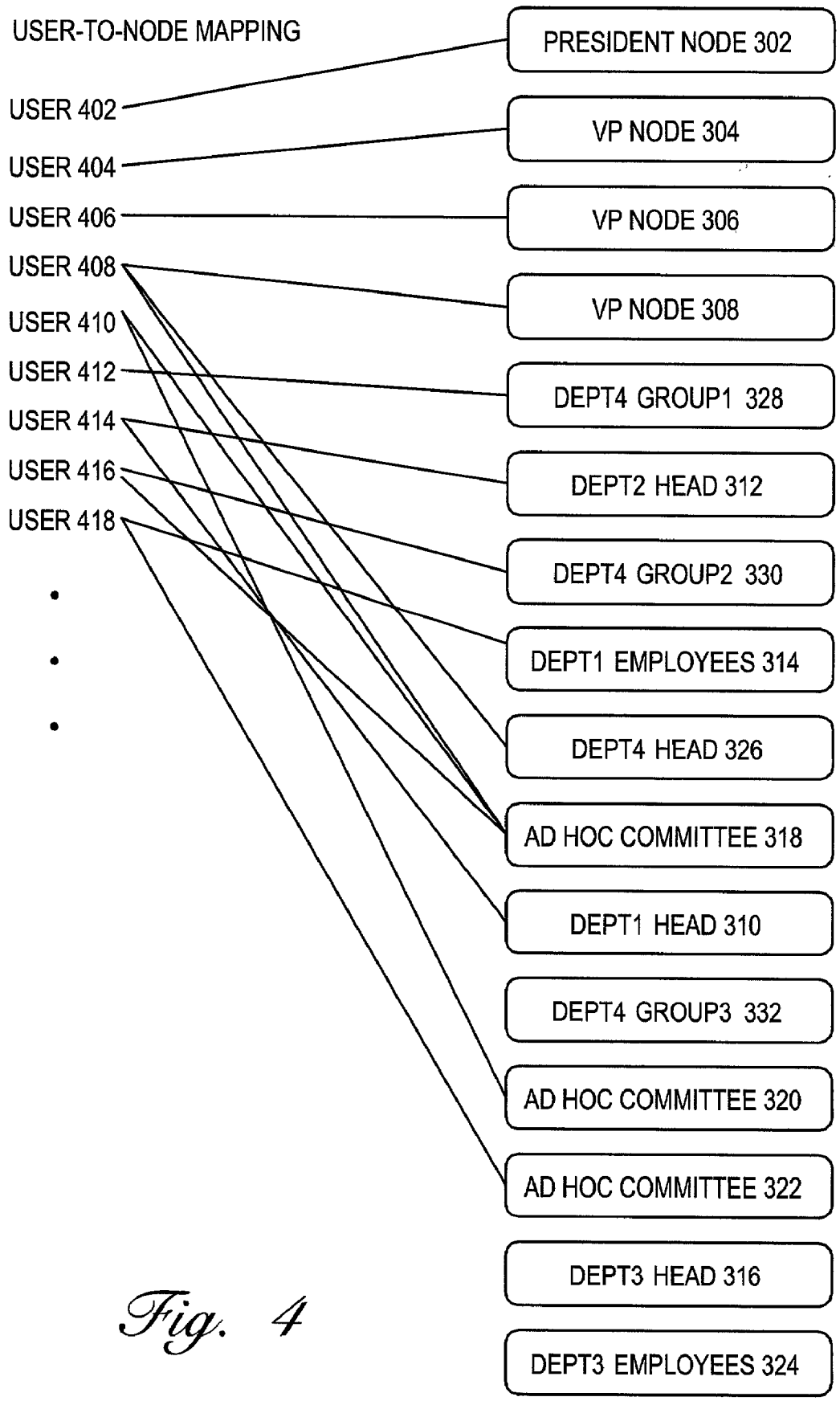
FIG. 4 is an example of a user-to-node mapping according to an embodiment of the invention.

Referring to FIG. 4, it illustrates a user-to-node mapping in which users within company X are mapped to the nodes of hierarchy 300 that correspond to the ORG-UNITs to which they belong. It should be noted that individual users may map to many nodes. Further, the nodes to which a user is mapped need not be part of the same branch in the hierarchy. For example, user 418 maps to DEPT 1 EMPLOYEES 314 and AD HOC COMMITTEE 322.

Figure 5:
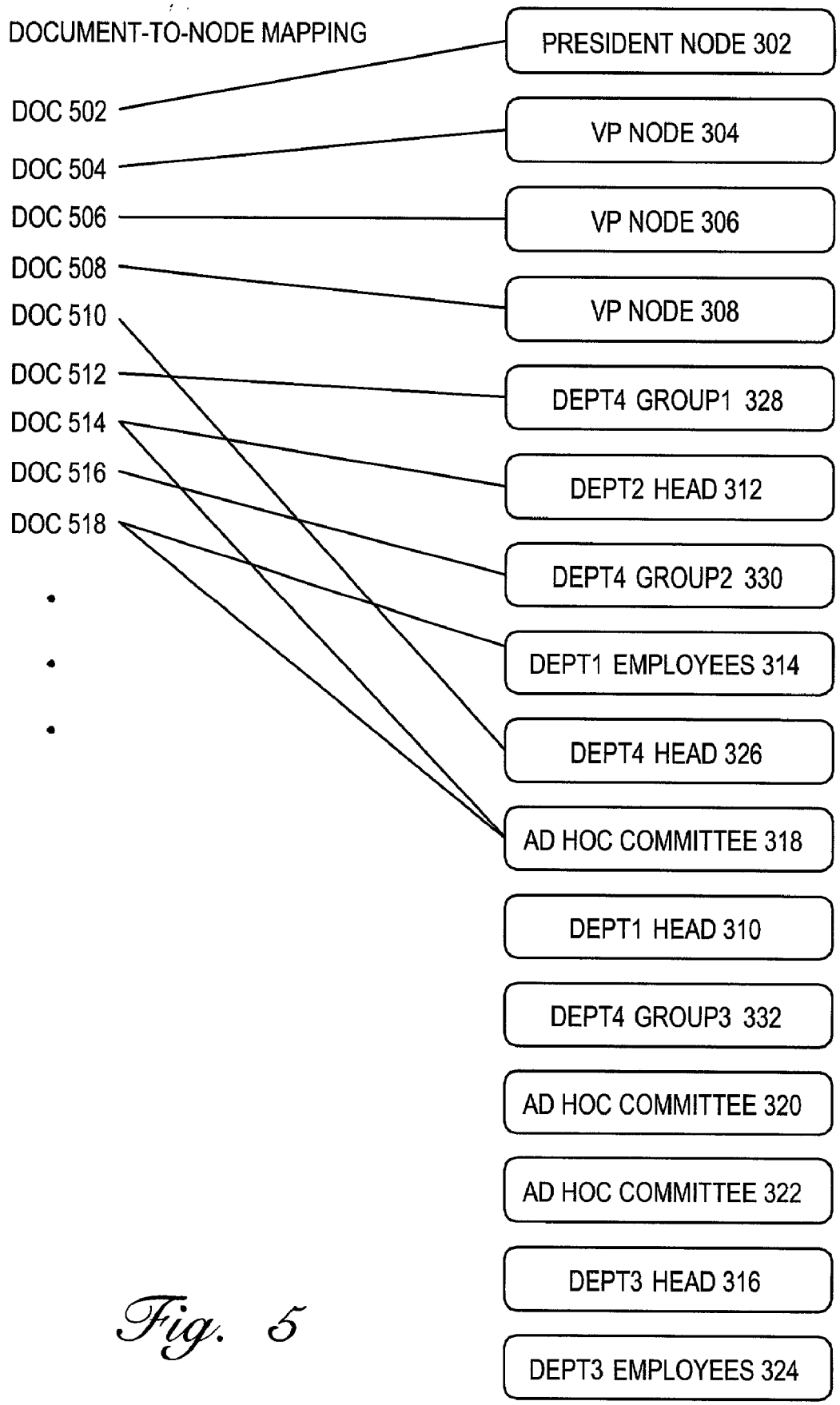
FIG. 5 is an example of a document-to-node mapping according to an embodiment of the invention.

Referring to FIG. 5, it illustrates a document-to-node mapping in which the documents 120 managed by repository 102 are mapped to the nodes of hierarchy 300. According to one embodiment, each document is mapped to the lowest node that corresponds to an ORG-UNIT that is allowed to access the document. For example, if ORG-UNITS 202, 204 and 210 are allowed access to a particular document, then that document would be mapped to the node corresponding to ORG-UNIT 210.

If ORG-UNITS in different branches of the hierarchy are allowed access to a document, then the document is mapped to the lowest node, in each of those branches, that corresponds to an ORG-UNIT allowed to access the document. For example, if ORG-UNITS 202, 204, 210, 206 and 220 are allowed access to a particular document, then that document would be mapped to the node corresponding to ORG-UNIT 210 and to the node corresponding to ORG-UNIT 220.

In an alternative embodiment, documents are mapped to all nodes that correspond to ORG-UNITS allowed to access the documents. For example, if ORG-UNITS 202, 204, 210, 206 and 220 are allowed access to a particular document, then that document would be mapped to the nodes corresponding to ORG-UNITS 202, 204, 210, 206 and 220.

In the illustrated mapping, DOC 502 is mapped to the PRESIDENT NODE 302. DOC 504 is mapped to VP NODE 304. DOC 506 is mapped to VP NODE 306. DOC 508 is mapped to VP NODE 308. DOC 510 is mapped to DEPT4 HEAD 326. DOC 512 is mapped to DEPT4 GROUP1 328. DOC 514 is mapped to DEPT2 HEAD 312 and AD HOC COMMITTEE 318. DOC 516 is mapped to DEPT4 GROUP2 330. DOC 518 is mapped to DEPT1 EMPLOYEES 314 and AD HOC COMMITTEE 316.

Exemplary Operation

With the hierarchy data 106, the user-to-node mapping data 108, and the document-to-node mapping data 110 established to reflect the relationships indicated in FIGS. 3, 4 and 5, respectively, access mechanism 112 would operate as follows. When a user 114 attempts to access documents 120 in repository 102, access mechanism 112 determines the identity of the user 114. Access mechanism 112 may determine the identity of a user 114 using any one of a variety of techniques. The particular technique employed by access mechanism 112 may depend on a variety of factors including the implementation of access mechanism 112.

For example, access mechanism 112 may detect the fingerprint of the user 114, and compare the fingerprint with stored fingerprint data. Alternatively, access mechanism 112 may read a bar code from an identification card assigned to user 114. In an embodiment in which repository 102 is implemented within a database, access mechanism 112 may simply determine the identity of user 114 based on the userid, or userid/password combination, that user 114 uses to log into the database server that manages repository 102.

After the user has been identified, the access mechanism 112 inspects the user-to-node mapping to determine the nodes to which the user is mapped. For example, assume that user 114 corresponds to user data 408. User data 408 maps to three nodes: VP NODE 308, DEPT4 HEAD 326 and AD HOC COMMITTEE 318.

The nodes to which a user maps determines the documents within repository 102 that access mechanism 112 allows the user to access. According to one embodiment, access mechanism 112 allows a user to access all documents that are mapped to (1) any node to which the user is mapped, or (2) any node that resides below any node to which the user is mapped. To determine the nodes that reside below the nodes to which the user is mapped, the access mechanism 112 inspects the hierarchy data 106. In the present example, the following nodes reside below VP NODE 308: DEPT4 HEAD 326, DEPT4 GROUP1 328, DEPT4 GROUP2 330 and DEPT4 GROUP3 332. The following nodes reside below DEPT4 HEAD 326: DEPT4 GROUP1 328, DEPT4 GROUP2 330 and DEPT4 GROUP3 332. No nodes reside below AD HOC COMMITTEE 318. Note that, in the present example, user 114 is not associated with any more nodes by virtue of being mapped to DEPT4 HEAD 326 than those to which user 114 is already associated by virtue of being mapped to VP NODE 308, which resides above DEPT4 HEAD 326 in the node hierarchy 300.

Based on the hierarchical data 106 and the user-to-node mapping 108, access mechanism 112 determines that the user 114 associated with user data 408 is allowed access to documents associated with any of nodes VP NODE 308, DEPT4 HEAD 326, DEPT4 GROUP1 328, DEPT4 GROUP2 330 and DEPT4 GROUP3 332, AD HOC COMMITTEE 318.

By inspecting the document-to-node mapping 108, access mechanism 112 is able to identify the specific set of documents to which user 114 is allowed access. In the present example, DOCS 508, 510, 512, 514, 516 and 518 are mapped to one or more of the nodes associated with user data 408. Consequently, access mechanism 112 allows user 114 to access those documents, and does not allow user 114 to access any other of documents DOC 502–518.

The manner by which access mechanism 112 allows access may vary from implementation to implementation, and the present invention is not limited to any particular access technique. For example, in a relational database implementation of repository 102, a database server may be configured to restrict all selections made in queries issued by user 114 in such a way as to only allow selection of the documents user 114 is allowed to see. Alternatively, user 114 may be presented with a file-system interface, where repository 102 appears as a directory or folder. When access mechanism 112 is invoked to display the contents of the folder, access mechanism 112 determines the documents that user 114 is allowed to see, and displays only those documents within the folder.

Regardless of what techniques are used by access mechanism 112 to restrict access to the documents, it is preferable to not only prevent a user from accessing documents to which the user is not allowed access, but also to prevent the user from learning of the existence of such documents. For example, rather than displaying a folder that lists all documents but only allows selection of some of them, it is preferred that access mechanism 112 cause the folder to display only the documents to which access is allowed.

Handling Modifications

Over time, the structures of most organizations change, as do the personnel, the roles assigned to individuals, and the documents used in those roles. The data maintained by repository 102 to determine who has access to which of documents 120 must by modified in response to such changes. Many changes involve minor modifications to the data, while other changes require more extensive modifications. According to one embodiment, modifications are handled as explained in greater detail hereafter.

User-Related Modifications

If a user ceases to be part of the organization, then the user data associated with the user is deleted, as are all links from that user data to nodes.

If a user ceases to belong to an ORG-UNIT in the organization, then the link between the user data associated with that user and the node associated with that ORG-UNIT is deleted. For example, if user 114 ceases to act as the head of DEPT4, then the link between user data 408 and DEPT4 HEAD 326 is deleted.

If a user is assigned to a new ORG-UNIT in the organization, then a link is added between the user data associated with that user and the node associated with that ORG-UNIT.

User-related modifications may be performed even when there is no change in ORG-UNIT membership. For example, even though a user is part of a particular ORG-UNIT, the user need not be granted the same access privileges as all other members of the ORG-UNIT. The access privileges of an ORG-UNIT may be denied to a member of an ORG-UNIT by not linking the user data for that member to the corresponding ORG-UNIT node in the user-to-node mapping. Similarly, access privileges of a user may be revoked by deleting the links between the user data for that user and one or more of the ORG-UNIT nodes in the user-to-node mapping.

Document-Related Modifications

If a document is deleted from repository 102, then the links between that document and any nodes are deleted.

If persons in a particular ORG-UNIT are no longer allowed to access a document, then the link between that document and the node associated with that ORG-UNIT is deleted. If persons in higher ORG-UNITS in the same branch are still allowed to access the document, then a link is established between the document and the lowest node in that branch that corresponds to an ORG-UNIT that is still allowed to access the document. For example, assume that members of AD HOC COMMITTEE 218 are no longer allowed access to DOC 514, but the person in VP ORG-UNIT 206 is still allowed access. Under these conditions, the link between DOC 514 and AD HOC COMMITTEE NODE 318 is deleted, and a new link between DOC 514 and VP NODE 306 is established.

If persons in a particular ORG-UNIT are allowed to access a document to which they previously were not allowed access, then a link is added between that document and the node associated with that ORG-UNIT. If a link already exists between the document and a node that is above that node, then that already-existing link may be deleted. For example, if DEPT4 GROUP 1 is allowed to access DOC 510, then a link is established between DOC 510 and DEPT4 GROUP 1 328, and the link between DOC 510 and DEPT4 HEAD 326 may be deleted.

Hierarchy-Related Modifications

If a new ORG-UNIT is created in the organizational hierarchy, then hierarchy data 106 is updated to include (1) a node associated with that ORG-UNIT, and (2) the relationship between that node and existing nodes.

If an ORG-UNIT is moved from one position to another in the organizational hierarchy, then the hierarchy data 106 is updated by adding a link between the corresponding node and its new parent, and deleting the link between the corresponding node and its old parent.

If an ORG-UNIT is dissolved, then the node associated with that ORG-UNIT is deleted. The nodes associated with all ORG-UNITS below the node of the dissolved ORG-UNIT are also deleted unless moved to other locations in the organization hierarchy. When a node is deleted, all user-to-node links and document-to-node links to that node are also deleted. If the deletion of a document-to-node link deletes the last document-to-node link from a document, then, according to one embodiment, the document is added to an "orphaned document pool". The administrator of repository 102 may then manually perform reassignments of the documents in the orphaned document pool to existing nodes.

In an alternative embodiment, when the last document-to-node link associated with a document is deleted, a new link is automatically established between the document and the lowest surviving node in the same branch as the deleted node. For example, assume that a document is linked to DEPT3 EMPLOYEES 324. If DEPT3 is dissolved, then nodes DEPT3 HEAD 316 and DEPT3 EMPLOYEES 324 will be deleted. The lowest remaining node in the branch to which DEPT3 EMPLOYEES 324 belongs is VP NODE 306. Thus, the document can be automatically be assigned to VP NODE 306 by creating a document-to-node link between the document and VP NODE 306.

Auto-Synchronization

According to one embodiment of the invention, techniques are provided for automatically synchronizing the hierarchy data 106 with a newly submitted set of hierarchy information. According to one embodiment, an administrator of repository 102 submits a set of data that indicates the modified hierarchy of a company. In response to receipt of the modified hierarchy data, the hierarchy data 106, user-to-node mapping data 108 and document-to-node mapping data 110 are modified. According to one embodiment, the synchronization is performed in a sequence that minimizes the number of orphaned documents that result from the re-organization. In particular, when a node no longer appears at the same location in the newly presented hierarchy as it does in the hierarchy data 106, it is only processed as a deleted node after confirming that it is not merely a moved node.

In such an embodiment, it is first determined which nodes in the modified hierarchy data are new relative to the existing hierarchy data 106. Then it is determined which nodes have moved in the new hierarchy data relative to the existing hierarchy data 106. Finally, after all of the new and moved nodes have been processed, it is determined which nodes have been deleted from the modified hierarchy data that currently exist in the hierarchy data 106. When performing the synchronization, it is particularly useful to perform inserts of new nodes before moves because some of the moved nodes may have to be placed below the newly inserted nodes. Moves are performed before deletions to ensure that moved nodes are not erroneously processed as deleted nodes.

According to one embodiment, during the insert phase of the synchronization, the hierarchy 300 is traversed using a traversal technique that ensures that each node is processed exactly once. Various traversal techniques are well known. During the traversal of hierarchy 300, it is important that parent nodes are processed before their children. For example, DEPT3 HEAD 316 should be inserted into hierarchy 300 before DEPT3 EMPLOYEES 324 so that child nodes can be linked to parent nodes as part of the node insertion process. Therefore, according to one embodiment, a traversal technique is employed that (1) ensures that each node is processed exactly once, and (2) ensures that parent nodes are processed before their children. Various known traversal techniques satisfy these requirements, including left-most tree transversal, right-most tree transversal, and top-to-bottom level-by-level transversal.

In an embodiment that is implemented in a relational database that supports SQL, the insert phase of the synchronization operation may be executed in response to submitting a hierarchical query to the database server. In such an embodiment, an efficient way to ensure that parent nodes are added to the hierarchy before child nodes is to use an insert statement that leverages the power of hierarchical queries. The following statement guarantees that parent nodes are inserted before their children by returning data in hierarchical order instead of by rowid order.

```
INSERT      INTO          FSP_NODE
SELECT                    FHS.NODE,
                          FHS.NODE_DESC,
                          FHS.PARENT_NODE,
                          FHS.SEQUENCE
FROM (
            SELECT        NODE,
                          NODE_DESC,
                          PARENT_NODE,
                          SEQUENCE
            FROM          FSP_HIERARCHY_SOURCE
            CONNECT BY    PRIOR NODE = PARENT_NODE
            START WITH    PARENT_NODE IS NULL
            ) FHS
WHERE       NOT EXISTS (
            SELECT        FN.NODE
            FROM          FSP_NODE FN
            WHERE         FHS.NODE = FN.NODE
);
```

In this example SQL statement the FSP_NODE table contains the current state of the organizational hierarchy and the FSP_HIERARCHY_SOURCE contains the new structure for the organizational hierarchy.

Attribute Matching

In the embodiments described above, a user's ability to see and access the documents 120 in the repository 102 is based entirely on the hierarchy data 106, the user-to-node mapping data 108 and the document-to-node mapping data 110. However, the hierarchy-based security provided by this technique may be combined with other security techniques that restrict access based on other factors. Thus, while access mechanism 112 restricts access based on the hierarchy data 106, the user-to-node mapping data 108 and the document-to-node mapping data 110, access mechanism 112 need not restrict access based exclusively on these factors.

For example, in one embodiment, security attributes are assigned to users and to documents. The values of the security attributes may include for example: management, generic, finance, etc. In such an embodiment, access mechanism 112 may be configured to determine which documents 120 a user is allowed to access based on a combination of the hierarchical techniques described herein and a matching operation between the security attributes assigned to the users and to the documents 120.

In one embodiment, the attribute-based security further restricts the hierarchy-based security. For example, a user that is mapped to an ORG-UNIT node may be denied access to a document that is mapped to that same ORG-UNIT node if the document has the "management" attribute value and the user does not.

In another embodiment, the attribute-based security is able to override the hierarchy-based security, at least in certain circumstances. For example, a user that has the "management" attribute value may be allowed access to a document that also has the "management" attribute value even though the user does not map to any node at or above the nodes to which the document is mapped.

Implementations

The techniques described herein may be implemented in a variety of environments using a variety of techniques. For example, the techniques may be incorporated into a file system, instead of or in addition to any other file security mechanisms provided thereby. For example, a file system may employ these techniques in addition to or instead of password protected directories.

According to one embodiment, the repository is implemented in a database that is made available to users over a network, such as the Internet. In such an embodiment, the user may access the database server by using a browser to send a request to a web server. The web server may, in turn, communicate the request to the database server. Initially, the user may be asked to log in to the database in order for the access mechanism 112 to determine the identity of the user. If the user has already logged in before, then the log in process may be handled transparent to the user through the use of cookies or similar mechanisms.

In response to the user's request, the access mechanism 112, which may be implemented within the database server or as a layer between the user and the database server, identifies which documents the user is allowed to access using the techniques described above. The access mechanism 112 then causes the web server to communicate to the user a web page with information about the documents that the user is allowed to access. The user may then access those documents through controls or links provided on the web page.

According to one embodiment, management of repository 102 is performed over the Internet using a web browser interface. In particular, upon verifying that a user has management authority over repository 102, the access mechanism 112 may send one or more web pages with controls that allow the user to: submit documents (and document-to-node assignment information), submit user-to-node assignments, and submit information about changes in the organization hierarchy. The document-to-node assignment information may be separate from the documents themselves, or may be metadata attached to or embedded in the documents.

Hardware Overview

Figure 6:
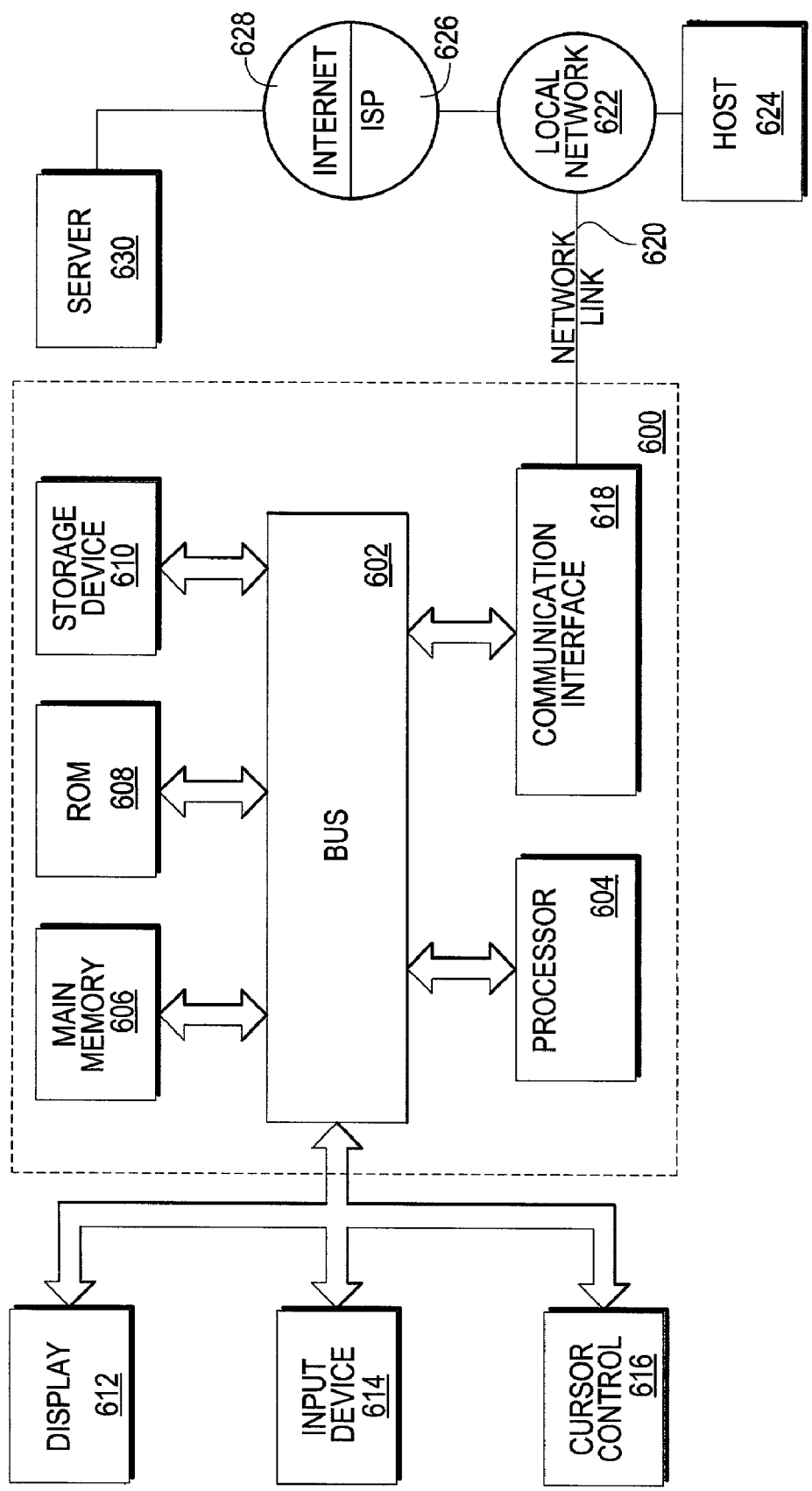
FIG. 6 is a block diagram of a computer system on which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify ORG-UNITs in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for providing users associated with an organization access to documents that belong to a set of documents, comprising the steps of:
   storing hierarchy data that identifies
   a set of nodes that correspond to ORG-UNITS associated with the organization; and
   hierarchical relationships between said nodes that reflect hierarchical relationships between the ORG-UNITS that correspond to said nodes;
   establishing a first mapping between the users and the set of nodes based on the ORG-UNITS to which the users belong;
   establishing a second mapping between the documents in said set of documents and the set of nodes; and
   determining which documents in said set of documents a user is allowed to access based on the hierarchy data, the first mapping and the second mapping.

2. The method of claim 1 wherein the step of determining includes determining that the user may access only a subset of documents in said set of documents, wherein said subset includes only documents that either:
   map to a node to which the user maps; or
   map to a node that, according to said hierarchical relationships, resides below a node to which the user maps.

3. The method of claim 2 further comprising the step of allowing the user to access the subset of documents without conveying to said user any information about documents in said set of documents that are not in said subset.

4. The method of claim 1 further comprising the step of automatically synchronizing the hierarchy data based on a new set of hierarchy information.

5. The method of claim 4 wherein the step of automatically synchronizing includes the steps of:
   inserting nodes that appear in the new set of hierarchy information but not in the hierarchy data into the hierarchy data;
   moving nodes that have new positions in the new set of hierarchy information to new positions in the hierarchy data; and
   deleting nodes that appear in the hierarchy data but not in the new set of hierarchy information.

6. The method of claim 5 wherein the step of inserting is performed before the step of moving, and the step of moving is performed before the step of deleting.

7. The method of claim 5 wherein the step of inserting involves traversing the hierarchy represented by the new hierarchy information.

8. The method of claim 7 wherein the step of traversing is performed using a transversal technique that ensures parent nodes are processed before their children nodes.

9. The method of claim 8 wherein the step of traversing is performed using a left-most tree transversal.

10. The method of claim 1 wherein the step of determining which documents said user is allowed to access is performed in response to a request received by a web server over a network from a browser on a client being used by said user.

11. The method of claim 1 further comprising the steps of:
storing said set of documents in a repository accessible to said server; and
providing from said repository to said user over said network one or more documents that said user is allowed to access.

12. The method of claim 11 further comprising the step of implementing said repository in a relational database system.

13. A computer-readable storage medium carrying instructions for providing users associated with an organization access to documents that belong to a set of documents, the instructions including instructions for performing the steps of:
storing hierarchy data that identifies
a set of nodes that correspond to ORG-UNITS associated with the organization; and
hierarchical relationships between said nodes that reflect hierarchical relationships between the ORG-UNITS that correspond to said nodes;
establishing a first mapping between the users and the set of nodes based on the ORG-UNITS to which the users belong;
establishing a second mapping between the documents in said set of documents and the set of nodes; and
determining which documents in said set of documents a user is allowed to access based on the hierarchy data, the first mapping and the second mapping.

14. The computer-readable medium of claim 13 wherein the step of determining includes determining that the user may access only a subset of documents in said set of documents, wherein said subset includes only documents that either:
map to a node to which the user maps; or
map to a node that, according to said hierarchical relationships, resides below a node to which the user maps.

15. The computer-readable medium of claim 14 further comprising instructions for performing the step of allowing the user to access the subset of documents without conveying to said user any information about documents in said set of documents that are not in said subset.

16. The computer-readable medium of claim 13 further comprising instructions for performing the step of automatically synchronizing the hierarchy data based on a new set of hierarchy information.

17. The computer-readable medium of claim 16 wherein the step of automatically synchronizing includes the steps of:
inserting nodes that appear in the new set of hierarchy information but not in the hierarchy data into the hierarchy data;
moving nodes that have new positions in the new set of hierarchy information to new positions in the hierarchy data; and
deleting nodes that appear in the hierarchy data but not in the new set of hierarchy information.

18. The computer-readable medium of claim 17 wherein the step of inserting is performed before the step of moving, and the step of moving is performed before the step of deleting.

19. The computer-readable medium of claim 17 wherein the step of inserting involves traversing the hierarchy represented by the new hierarchy information.

20. The computer-readable medium of claim 19 wherein the step of traversing is performed using a transversal technique that ensures parent nodes are processed before their children nodes.

21. The computer-readable medium of claim 20 wherein the step of traversing is performed using a left-most tree transversal.

22. The computer-readable medium of claim 13 wherein the step of determining which documents said user is allowed to access is performed in response to a request received by a web server over a network from a browser on a client being used by said user.

23. The computer-readable medium of claim 13 further comprising instructions for performing the steps of:
storing said set of documents in a repository accessible to said server; and
providing from said repository to said user over said network one or more documents that said user is allowed to access.

24. The computer-readable medium of claim 23 further comprising instructions for performing the step of implementing said repository in a relational database system.

* * * * *